W. BARTELT.
AUTOMOBILE RADIATOR PROTECTOR.
APPLICATION FILED FEB. 16, 1918.
1,326,167.
Patented Dec. 30, 1919.
2 SHEETS—SHEET 1.
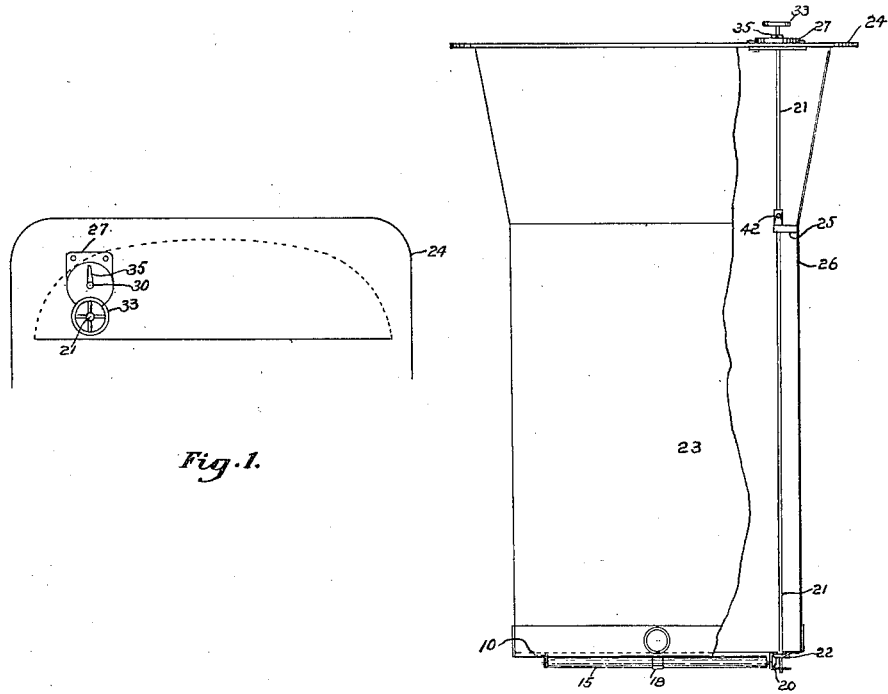
Fig.1.
Fig.2.
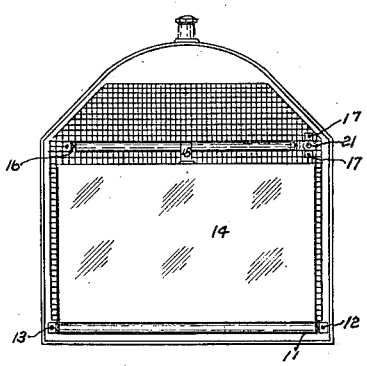
Fig.3.
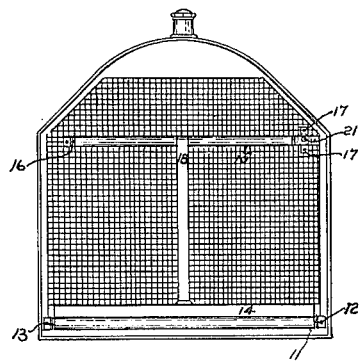
Fig.4.
INVENTOR.
William Bartelt
BY
L. L. Westfall
ATTORNEYS.

W. BARTELT.
AUTOMOBILE RADIATOR PROTECTOR.
APPLICATION FILED FEB. 16, 1918.

1,326,167.

Patented Dec. 30, 1919.
2 SHEETS—SHEET 2.

INVENTOR
William Bartelt

BY
L. L. Westfall
ATTORNEY

UNITED STATES PATENT OFFICE.

WILLIAM BARTELT, OF SPOKANE, WASHINGTON.

AUTOMOBILE-RADIATOR PROTECTOR.

1,326,167.  Specification of Letters Patent.  Patented Dec. 30, 1919.

Application filed February 16, 1918. Serial No. 217,547.

*To all whom it may concern:*

Be it known that I, WILLIAM BARTELT, a citizen of the United States of America, residing at Spokane, in the county of Spokane and State of Washington, have invented new and useful Improvements in Automobile-Radiator Protectors, of which the following is a specification.

This invention pertains to gas driven automobiles having a carriage body and a water cooling system comprising a radiator through which water circulates in tubes and through which air circulates between the tubes.

The object of the invention is to regulate the circulation of the air through the radiator as stated, preventing such circulation in whole or in part, and restoring such circulation in whole or in part, as may be desired, and to operate the same blindly or from the driver's seat in the carriage body. Experience in the operation of gas driven automobiles having open radiators whereby the engine is retarded in its heating process in cold weather and in the freezing of the water while the automobile is standing or driven against a cold current of air, makes the benefits of such a construction obvious. I accomplish my purpose by installing a shade or blind in front of and over the mesh of the radiator in such a manner that the same is adjustable by a mechanism connected therewith and which may be operated blindly from the driver's seat.

In the drawings forming a part of this specification,

Figure 1, is a diagrammatic view of a portion of an automobile dash, showing the instrument board and an end view of the shade or blind operating mechanism.

Fig. 2, is a broken-away, top plan view of an automobile dash, hood and radiator, with my device attached thereto.

Fig. 3, is a front view of a radiator with my device attached thereto showing the shade drawn largely over the front thereof.

Fig. 4, is a front view of the radiator with the device attached, showing the shade dropped and rolled up at the bottom thereof.

Figure 5:
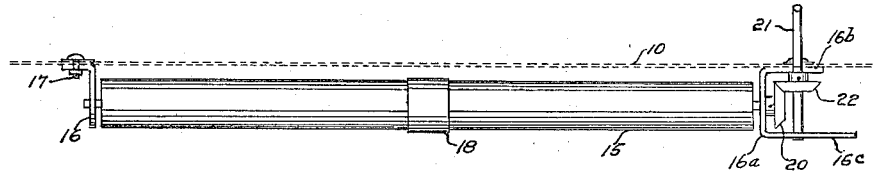
Fig. 5, is a top plan view of the front end of the device, showing the manner of fastening the same to the radiator.
Figure 6:
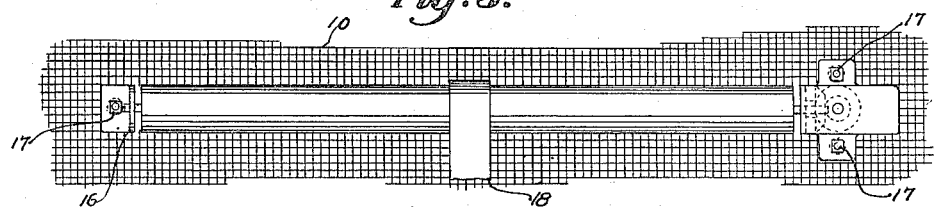
Fig. 6, is a broken-away front view of the same as pertains to the upper portion thereof.
Figures 7, 8:
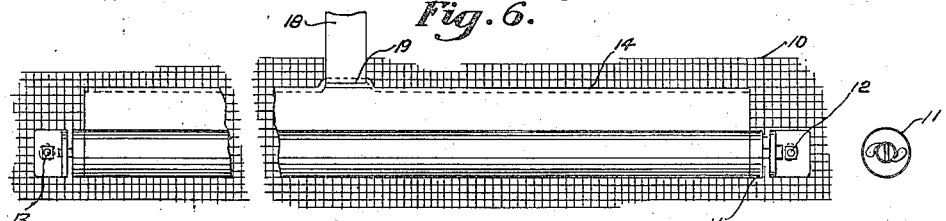
Fig. 7, is a broken-away front view of the same as pertains to the lower portion thereof.
Fig. 8, is an end view of the lower roller upon which the blind is wound.
Figure 9:
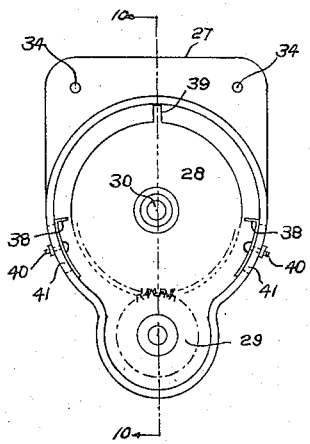
Fig. 9, is an enlarged rear view of the operating mechanism attached to the instrument board on the dash.
Figure 10:
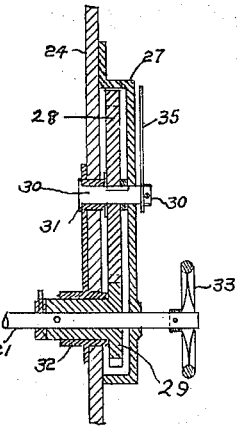
Fig. 10, is a sectional view taken on the line 10—10 of Fig. 9.

In a detail description in which like numbers refer to like parts throughout the several views, at the bottom of the radiator 10 a spring roller 11 is rotatably and horizontally mounted in brackets 12 secured to the radiator 10 by means of bolts 13 extending through the mesh of the radiator. On the roller 11 is wrapped a shade or other air-tight flexible covering 14 of sufficient length and breadth to substantially cover the radiator front. At the top of the radiator 10 front is rotatably and horizontally mounted a roller 15 the same being secured by brackets 16 and 16ª fastened to the radiator 10 as by bolts 17 passing through the mesh of the radiator. A strap 18 is secured at a central position on the roller 15 and attached to the shade 14 as at 19. Mounted on the end of the roller 15 and rigidly secured thereto is a bevel gear 20. Mounted on a rod 21 and rigidly secured thereto, extending through the mesh of the radiator 10 and supported by the walls 16ᵇ and 16ᶜ of the bracket 16ª in which the same is rotatably mounted is a bevel gear 22 meshing with the gear 20 on the end of the roller 15. The rod 21 extends rearwardly underneath the hood 23 to the dash 24. Between the radiator 10 and the dash 24 it is desirable that the rod 21 be supported as by a bracket 25 attached to the chassis 26 of the automobile. Within a frame 27 are mounted two gears 28 and 29, the former being rigidly and rotatably mounted on a stud 30 passing through the plate 27 and through a sleeve 31, mounted in the dash 24, the latter being rigidly mounted on the rod. The rod 21 extends through a sleeve 32 mounted in and extended through the dash 24. The rod 21 also passes through the plate 27 and has mounted on the end thereof a wheel 33 rigidly secured thereto. The gears 28 and 29 mesh with each other. The frame 27 is secured to the instrument board on the dash 24 as by bolts or screws passing therethrough at 34 or in any other suitable manner. To the visible end of the stud 30 is secured an indicator 35.

Figure 11:
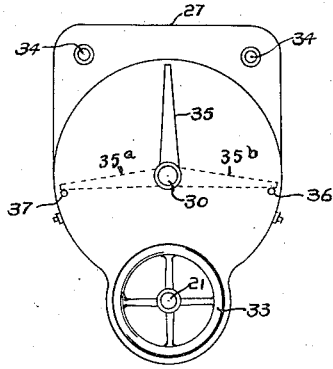
Fig. 11, is an enlarged front view of the operating mechanism attached to the instrument board of the dash
Figure 12:
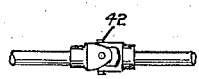
Fig. 12, is a view of a knuckle in the rod connecting the mechanism on the radiator and on the instrument board of the dash, showing broken-away portions of the rod attached thereto.

In the practical operation of the device, the shade 14 is normally wrapped on the roller 11 as shown in Fig. 4. When it is desired to check the flow of air through the mesh of the radiator 10, the operator turns the wheel 33 whereby the gear 22 on the end of the rod 21 meshing with the gear 20 on the end of the roller 15 rotates the roller 15, the strap 18 rolling up over the roller 15 and pulling upwardly the shade 14, unrolling the same from the roller 11 and bringing the same up over the radiator front as indicated in Fig. 3. During this operation the indicator 35, Fig. 11, has changed positions. The indicator 35, for instance, might be so mounted on the stud 30 that when the indicator is in the position of the dotted lines 35ª the shade would be completely down or completely wrapped on the roller, as indicated in Fig. 4, while on the other hand when in the position of the dotted lines 35ᵇ the shade would be in a position substantially covering the mesh of the radiator 10 as indicated in Fig. 3. Suitable stops 36 and 37 are provided in the frame 27 which will check the rotation of the gear system shown and indicate when the shade is completely up or completely down. Intermediate positions of the indicator will inform the operator of the intermediate positions of the shade. Thus it will be seen that the shade may be operated blindly, or without the actual observation of the position of the shade. Provision has been made for the shortening of the rotation of the mechanism by means of stops 38 mounted within the frame 27 and adjacent to the gear 28 to the periphery of which is secured a lug 39. The rotation of the gear 28 brings the lug 39 into contact with the stops 38 which stops the further rotation thereof. These stops 38 are made adjustable so as to lengthen or shorten the rotation of the gear 28 and thereby lengthen or shorten the field of operation of the shade 14 as may be desired. This adjustment is effected by means of thumb-screws or bolts 40 reaching to the surface of the frame 27 and extending through longitudinally arranged stops 41 in the wall of said frame and connected with said stops 38. Referring again to Figs. 2 and 12, it will be noted that a knuckle 42 is provided in the rod 21. This may be a knuckle of any suitable form or a universal joint, the idea being to provide for an angle in the rod 21 and not to interfere with the proper operation of the same.

What is claimed is,

The combination with a gas propelled automobile having a radiator, a hood and a dash board, of a shade attached to a spring roller rotatably and horizontally secured to the lower portion of the front side of the radiator, a roller horizontally and rotatably attached to upper portion of the front side of the radiator, a strap attached to said upper roller and to the shade on said lower roller, a gear on the end of said upper roller, a gear meshing with said first named gear attached to a rod extending forward to the dash of the automobile, manually operative means for rotating said rod, means for gaging the extent of the rotation of said rod and for indicating on the instrument board of the dash the position of the shade on the face of the radiator.

In testimony whereof, I affix my signature in presence of two witnesses.

WILLIAM BARTELT.

Witnesses:
J. E. McANDREW,
L. L. WESTFALL.